United States Patent
Sridhara et al.

(10) Patent No.: US 9,396,062 B1
(45) Date of Patent: Jul. 19, 2016

(54) GROUP BASED CODES FOR MULTI-DIMENSIONAL RECORDING (MDR)

(71) Applicants: Deepak Sridhara, Longmont, CO (US); William Radich, Longmont, CO (US); Ara Patapoutian, Hopkinton, MA (US); Timothy R Feldman, Louisville, CO (US); Mark Gaertner, Vadnais Heights, MN (US)

(72) Inventors: Deepak Sridhara, Longmont, CO (US); William Radich, Longmont, CO (US); Ara Patapoutian, Hopkinton, MA (US); Timothy R Feldman, Louisville, CO (US); Mark Gaertner, Vadnais Heights, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 63 days.

(21) Appl. No.: 14/245,886

(22) Filed: Apr. 4, 2014

(51) Int. Cl.
  *G11C 29/00* (2006.01)
  *G06F 11/10* (2006.01)

(52) U.S. Cl.
  CPC ............ *G06F 11/10* (2013.01); *G06F 11/1008* (2013.01); *G06F 11/1044* (2013.01); *G06F 11/1068* (2013.01)

(58) Field of Classification Search
  CPC . H03M 13/29; H03M 13/2906; H04L 1/0045
  See application file for complete search history.

(56) References Cited

U.S. PATENT DOCUMENTS

| | | | |
|---|---|---|---|
| 5,812,603 A * | 9/1998 | Luthi | H04L 1/0045 375/287 |
| 5,953,636 A * | 9/1999 | Keate | H04H 40/90 348/731 |
| 6,772,384 B1 | 8/2004 | Noguchi | |
| 6,832,042 B1 * | 12/2004 | Shieh | G11B 20/10009 360/53 |
| 7,093,179 B2 | 8/2006 | Shea | |
| 7,221,680 B2 * | 5/2007 | Vijayan | H04B 7/12 370/335 |
| 7,289,530 B1 * | 10/2007 | Yuan | H03M 13/2906 370/465 |
| 7,356,753 B2 | 4/2008 | Chen | |
| 7,724,853 B2 | 5/2010 | Jin | |
| 8,230,296 B2 | 7/2012 | Andrel et al. | |
| 8,239,725 B2 | 8/2012 | Radke | |
| 8,339,322 B2 * | 12/2012 | Zaila | H01Q 1/243 343/700 MS |
| 8,370,702 B2 * | 2/2013 | Amato | H03M 13/29 714/753 |
| 8,489,979 B2 | 7/2013 | Rub | |
| 8,539,322 B2 * | 9/2013 | Miyauchi | G11B 20/1833 714/788 |
| 8,572,457 B2 | 10/2013 | Rub | |
| 8,640,012 B2 | 1/2014 | Jiang | |
| 2007/0150798 A1 | 6/2007 | Shieh | |
| 2010/0146372 A1 | 6/2010 | Tomlinson | |
| 2010/0253555 A1 | 10/2010 | Weingarten | |
| 2012/0278679 A1 | 11/2012 | Rub | |

\* cited by examiner

*Primary Examiner* — Esaw Abraham
(74) *Attorney, Agent, or Firm* — Cesari & Reed, LLP; Kirk A. Cesari

(57) ABSTRACT

A multi-dimensional recording (MDR) system may include a group based coding circuit (GBCC) which can implement error correcting codes via outer codes. The GBCC can implement outer codes, including interleaving outer codes, in MDR systems where inner codewords include multiple memory groupings. The multiple memory groupings may be across different structural divisions within a data storage medium; or could be across multiple different data storage mediums.

20 Claims, 10 Drawing Sheets

GROUP BASED CODES FOR MULTI-DIMENSIONAL RECORDING (MDR)

SUMMARY

In some embodiments, an apparatus can comprise a circuit configured to receive data from at least two inputs, determine inner codewords and outer codewords corresponding to the data, and perform error correction operation on the data based on the inner codes and outer codes.

In some embodiments, an apparatus can comprise a data storage medium including a first data set stored in a first distinct area, and a second data set stored in a second distinct area. Further, the apparatus may include inner codes and outer codes corresponding to a pre-determined combination of the first data set and the second data set, and the inner codes and outer codes can include data to perform error correction operations on the first and second data sets.

In some embodiments, a method may comprise receiving first data from a first input of at least two inputs, the first data including first segments of data, and each first segment may have multiple symbols. The method may further comprise receiving second data from a second input of the at least two inputs, the second data including second segments of data, each second segment having multiple symbols. Further, the method can include determining the outer and inner codes corresponding to the data, and performing error correction operations on the data based on the inner and outer codes.

DETAILED DESCRIPTION

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software programs running on a computer processor or controller. In accordance with another embodiment, the methods and functions described herein may be implemented as one or more software programs running on a computing device, such as a personal computer that is using a disc drive. Dedicated hardware implementations including, but not limited to, application specific integrated circuits, programmable logic arrays, and other hardware devices can likewise be constructed to implement the methods and functions described herein. Further, the methods described herein may be implemented as a computer readable storage medium or device including instructions that when executed cause a processor to perform the methods.

Storage systems, such as disc storage systems or solid state memory storage systems, can store data that can be corrupted or contain errors. Error correction codes, such as inner and outer codes, can protect the data by providing error correction capabilities.

Figure 1:
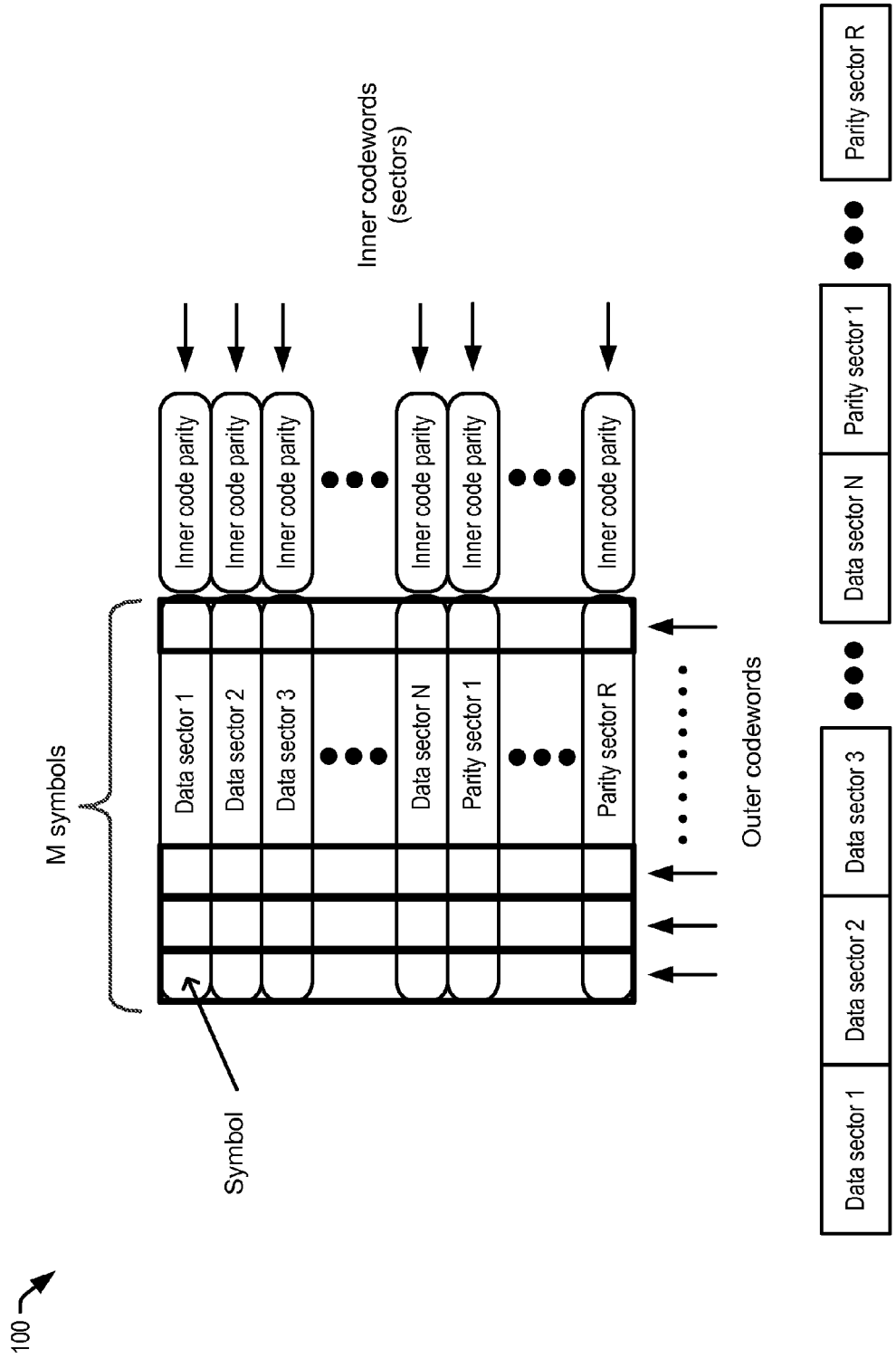
FIG. 1 is a system of group based codes for data storage, in accordance with certain embodiments of the present disclosure.

Referring to FIG. 1, a system of group based codes for data storage is shown and generally designated 100. A data storage device (DSD) may preserve the integrity of data, such as user data and parity data with error correcting code (ECC), and can include multi-dimensional recording (MDR) system(s). A DSD may be a magnetic storage device, optical storage device, solid state storage device, hybrid storage device, or other storage device, or any combination thereof. In some systems, inner codes, outer codes, or both may protect user data. User data may be data received from a host, a user input device, another device, or any other data that is not DSD system data or servo data.

MDR systems can include at least two data sets, which can have symbols and segments. In magnetic disc systems, data sets may be tracks, segments may be sectors, and symbols can be a grouping of one or more data bits. In other systems, such as solid state memory systems, data sets may be memory blocks, segments can be pages, and symbols can be a grouping of one or more bits.

Sectors can be the base unit of data storing for a DSD. For example, a magnetic discs and flash memory can have sectors that can store 4096 bytes of data per sector, although in some embodiments, sectors may have other storage capacities, such as 2048 bytes. Sectors may have additional storage capacity that may store ECC (e.g. inner codes, inner code parity). The data may be grouped into symbols (e.g. outer codewords), which can include one or more bits of data. In example system 100, a data sector, which can store user data, or parity sector, which can store parity data based on outer codes, can contain M symbols.

Outer codes can include outer codewords, and may provide error correction for multiple sectors Inner codes, which can include inner codewords, may protect user data on a sector basis; the DSD may generate ECC for data in data sectors or parity sectors.

Inner codes may recover corrupted data or restore data errors in a sector when the amount of corrupted data is within the recovery capacity of the encoded parity symbols. For example, inner codes may restore a six bit data error when the restorative capability of the inner codes is six bits or greater.

Outer codes may have a larger error handling capability than inner codes. When a data error(s) is beyond the restorative capability of the inner codes, the size of the data error(s) may be within the restorative capacity of the outer codes. Outer codes may also restore data from more than one sector.

Outer codes may provide a redundancy to inner codes. However, restoring data errors using outer codes may be a slower process than with inner codes because outer code data may be collected from sectors in different areas of the DSD, whereas inner code parity (e.g. inner codewords) may be stored in the sector(s) containing the corrupted data.

Figure 2:
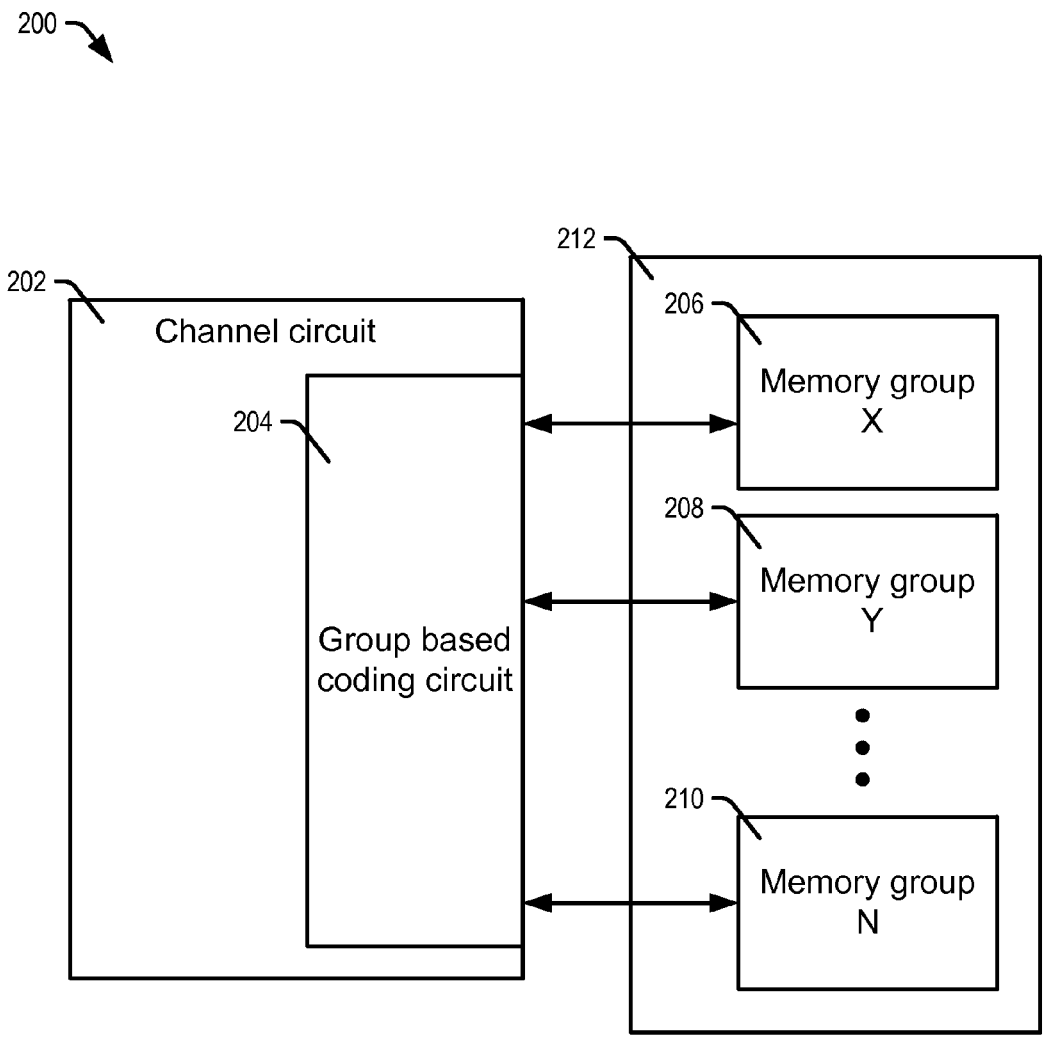
FIG. 2 is a system of group based codes for MDR, in accordance with certain embodiments of the present disclosure.

Referring to FIG. 2, a system of group based codes for MDR is shown and generally designated 200. In some data storage systems, two or more memory groups may be accessed simultaneously. Memory groups may be different memory types, such as magnetic storage, optical storage, or flash storage, and may be located in different physical locations. A data storage system may access data in memory groups from one or more DSDs simultaneously. For example, a data storage system may access data on a magnetic disc, optical disc, or flash memory at the same time.

A multi-dimensional recording (MDR) system can be a system in which two or more memory groups can be accessed at one time. In some examples, MDR systems may be TDMR (two-dimensional magnetic recording) systems. Error correcting codes, such as inner and outer codes, may be recalculated when data in a memory group changes. The inner and outer codes which may be determined by the data in the MDR system as a whole rather than on a memory group basis. For example, the inner and outer codes in one or more memory groups of the MDR system may be updated when new data is stored to a memory group, when data is moved within a memory group, or when data is deleted from a memory group.

The system 200 can have a channel circuit 202, a group based coding circuit (GBCC) 204, and MDR system 212 including a memory group X 206, memory group Y 208, through memory group N 210. In some examples, the MDR system 212 may be a solid state memory, such as a buffer, and the memory groups 206, 208, and 210 may be data blocks. In other examples, the MDR system 212 may be disc storage, and the memory groups 206, 208, and 210 may be tracks, while in yet other embodiments, the MDR system 212 may be a hybrid system. Memory groups can include a base unit of data storing, such as a sector, which may be a sector on a magnetic disc track, or a page in a flash memory block.

The channel circuit 202 can be included in a system on chip (SOC) or with other components, such as a controller (not shown), processor (not shown), preamp (not shown), the TDR 212, or other components, or may be stand-alone. The group based coding circuit 204 may be integrated with the channel circuit 202, included in an SOC or with other components, such as the MDR system 212, or may be stand-alone.

The channel circuit 202 can be configured to access multiple memory groups in the MDR system 212 simultaneously. For example, the channel circuit 202 may access memory group X 206 and memory group N 210 simultaneously. The GBCC 204, which can include a Reed-Solomon (RS) encoding/decoding circuit, a low-density parity-check (LDPC) encoding/decoding circuit, or other circuits, can implement different configurations of outer codes. The GBCC 204 may encode user data to produce parity data based on outer codewords corresponding user data the memory groups 206, 208, and 210. In some embodiments, the channel circuit 202 may store the parity data to MDR system 212. The channel circuit 202 may calculate inner codes, and may store the inner codes to system 212. In other embodiments, the GBCC 204, a processor, a controller, or other circuit may calculate the inner codes or store the inner codes to system 212. In yet other embodiments, firmware or software can calculate the inner codes and store them to the system 212.

Inputs to the GBCC 204 can come from different sources (e.g. 206, 208, 210) at the same time or at different times. For example, data from sources 206 and 208 may be received at the same time or substantially or approximately the same time, while data from 210 can be received earlier or later. In some cases, two or more inputs of the GBCC may be coupled to a single source; data from one input may be received at a different time than data on another input.

Figure 3:
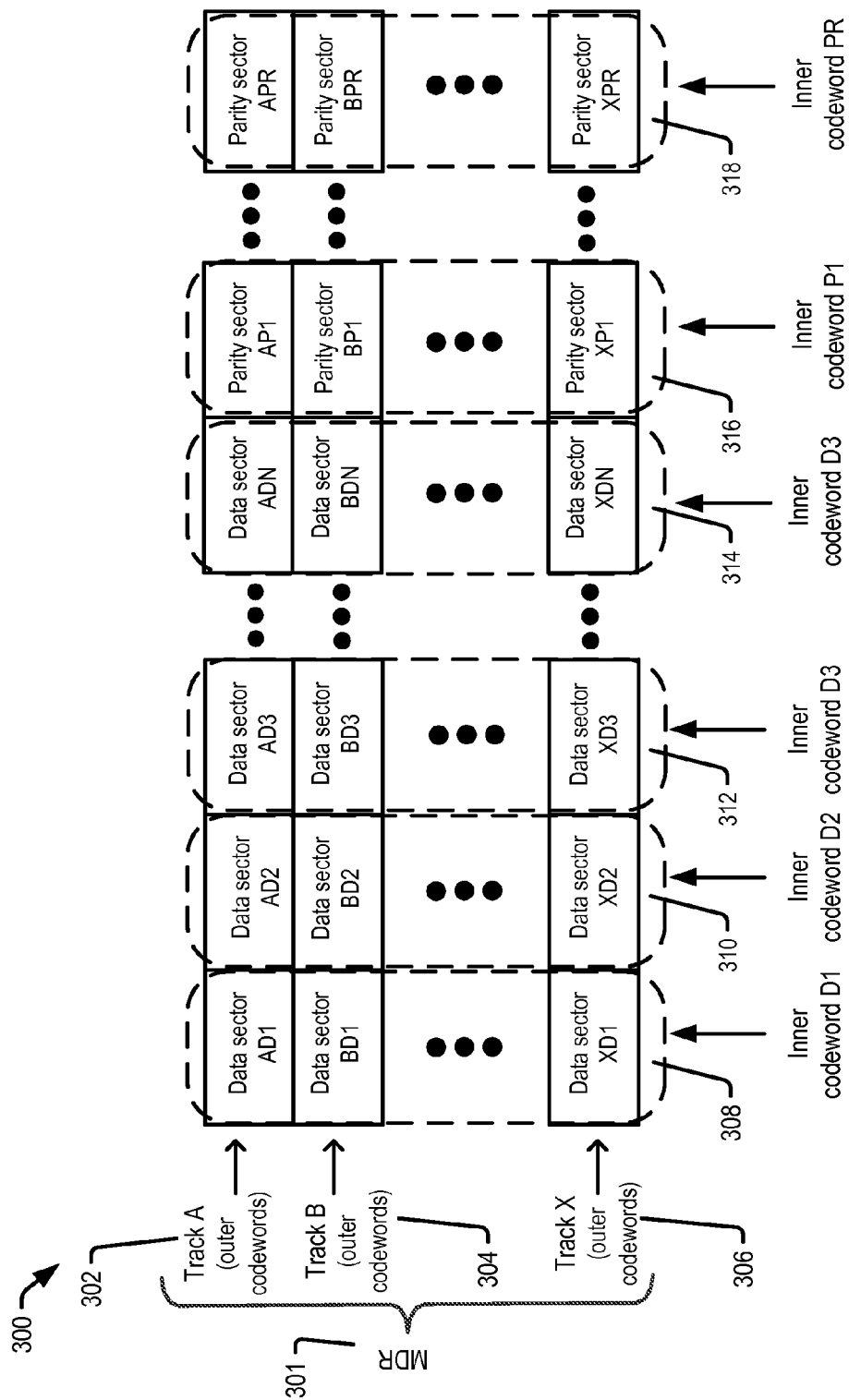
FIG. 3 is a system of group based codes for MDR, in accordance with certain embodiments of the present disclosure.

Referring to FIG. 3, a system of group based codes for MDR is shown and generally designated 300. System 300 may be an example embodiment of system 200. In some embodiments, an MDR system can include a plurality of tracks, and each track may span one or more sectors.

MDR systems may be used in heat-assisted magnetic recording (HAMR) systems, shingled magnetic recording (SMR) systems, perpendicular magnetic recording, bit-patterned media (BPM) recording, or other data systems. In some embodiments, such as disc storage systems, multiple tracks may be simultaneously accessed via multiple read elements on a recording head. In other systems, such as non-volatile memory systems, data may be accessed via multiple data input lines. In yet other systems, such as wireless systems, data may be accessed via multiple antenna inputs. An MDR system may access offset sectors; the read elements may be offset by multiple bit cells.

System 300 can include MDR system 301, track A 302, track B 304, through track X 306. Each track can include N user data sectors (e.g. data sectors AD1, AD2, and so forth), and R parity data sectors (e.g. AP1 through APR). Data and parity sectors may have outer codes (not shown), which may restore user data anywhere in MDR system 301, and inner codes (e.g. 308, 310, 312, 314, 316, and 318), which can correct data errors, such as squeeze errors, in sectors containing user data. For example, inner codeword D1 308 may restore user data in sector AD1, BD1, XD1, or other sectors, or any combination thereof.

The error correcting codes in inner codewords may be a Reed-Solomon (RS) correcting code, binary or non-binary low-density parity-check (LDPC) code, Bose-Chaudhuri-Hocquenghem (BCH) code, or other correcting codes, or any combination thereof. Inner codewords may be larger or more robust for MDR systems than non-MDR systems. For example, the inner codeword for a two track MDR system may be twice as big as an inner codeword corresponding to single track, non-MDR system. The size of an inner codeword may also change due to other factors, such as code rate. Code rate (CR) is a ratio of user data to the sum of user and parity data, and can range in value from $0 < CR \leq 1$. MDR and non-MDR systems with a low code rate may have a more robust ECC than systems with a higher code rate. When data in one or more sectors protected by an inner codeword is corrupted or has an error, an MDR system may attempt to restore the corrupted data or data errors via inner codeword. For example, when data in one or more of the data sectors AD2, BD2, through XD2 are corrupt, the MDR system 300 may attempt to restore the corrupted data via the inner codeword D2. Since multiple sectors may be accessed simultaneously in MDR systems, errors that are too large to correct with inner codes in non-MDR systems may be corrected in MDR systems without resorting to the resource consuming outer code restoration process.

Outer codewords, which can be an RS correcting code, a simple exclusive-or (XOR) super parity code, a BCH code, a binary or non-binary LDPC code, or any combination thereof, may be used to correct errors in system 300 that the inner codewords are unable to correct. In some examples, outer codes may be implemented the same way for all tracks in an MDR system, however, in other examples, the GBCC may implement the outer codes differently for some tracks in the MDR.

Figure 4:
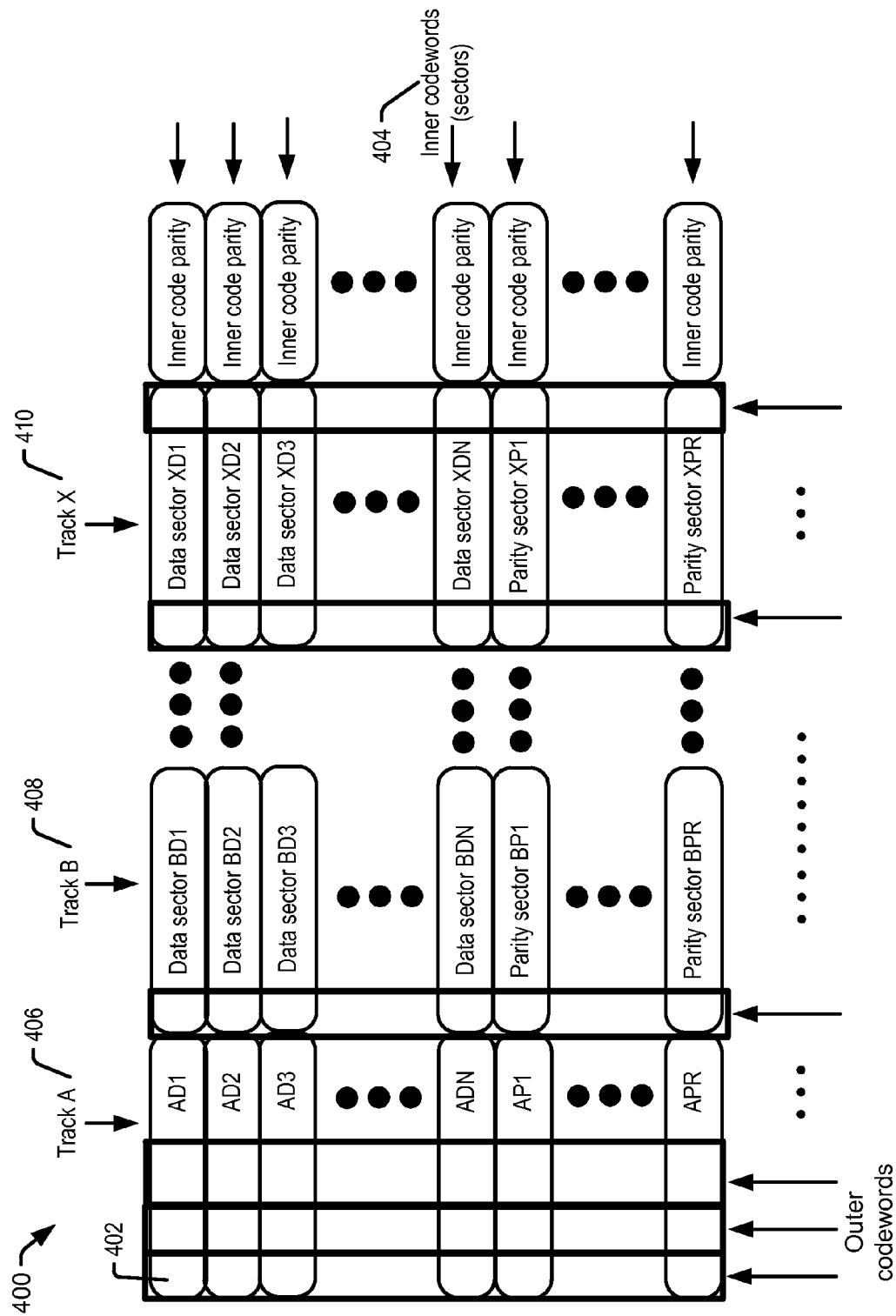
FIG. 4 is a system of group based codes for MDR, in accordance with certain embodiments of the present disclosure.

Referring to FIG. 4, a system of group based codes for MDR is shown and generally designated 300. System 400 may be an example embodiment of system 300. System 400 can include an MDR system, such as MDR system 301, which can include outer codewords (symbols) 402, inner codewords 404, track A 406, track B 408, through including track X 410. Tracks A 406, B 408, and X 410, may include user data sectors, including N data sectors and R parity sectors. In some examples, the number of data sectors and parity sectors may differ from track to tack (e.g. track B 408 may have M data sectors and Q parity sectors).

The number of outer codewords may differ from track to track. For example, track A 406 may have L symbols (codewords), track B 408 may have M codewords, and track X 410 may have Z codewords. The GBCC may encode the codewords on an MDR basis rather than a track by track basis. For example, when the outer codewords are encoded on an MDR basis, the GBCC may combine and encode the outer codewords from track A 406, track B 408, and track X 410, and store the encoded outer codewords to parity sectors in the MDR system; outer codewords from all tracks in a MDR system may be considered when implementing outer code encoding, although in some embodiments, only some of the outer codewords may be considered. Encoding the outer codewords of an MDR system may provide a higher level of data protection than other data storage systems.

Figure 5:
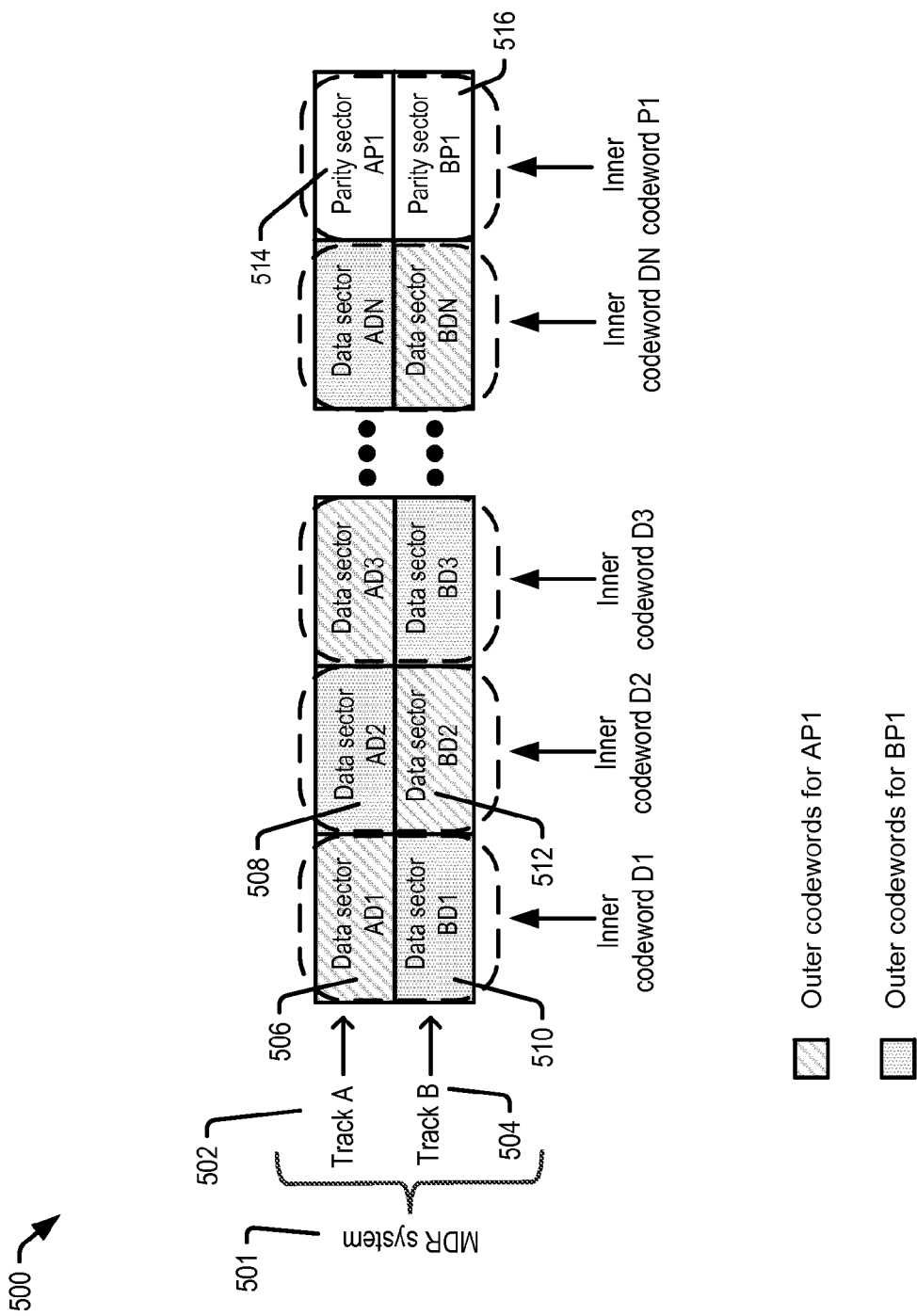
FIG. 5 is a system of group based codes for MDR, in accordance with certain embodiments of the present disclosure.

Referring to FIG. 5, a system of group based codes for MDR is shown and generally designated 500. System 500 may be an example embodiment of systems 200, 300, and 400. System 500 can include MDR system 501, track A 502, and track B 504. MDR system 501 can also include data sector AD1 506, data sector AD2 508, data sector BD1 510, data sector BD2, parity sector AP1 514, parity sector BP1 516, or other sectors.

In some MDR systems outer codes may be located on different tracks. For example, outer codes may span interleaved symbols that may alternate by sector between two or more tracks. In other examples, there may be codewords from a sector in a track that alternate with a codewords from another sector in another track. In other cases, interleaving can continue through some or all of the track. In the example of system 500, a GBCC, such as GBCC 204, may determine a first outer code by combining the outer codewords of the odd sectors of track A 502 (e.g. data sector AD1 506) and the even sectors of track B 504 (e.g. BD2 512). The first outer code may be stored in parity sector AP1 514. A second outer code can be determined by combining the outer codewords of the even sectors of track A 502 (e.g. AD2 508) and the odd sectors of track B 504 (e.g. BD1 510).

MDR systems may have interleaving outer code implementations that do not alternate by sector. Outer code implementations may alternate tracks every two or more sectors. For example, outer codewords that may be encoded and stored to AP1 514 may come from data sectors AD1 506, AD2 508, BD3, and BD4 (not shown). The interweaving pattern can continue through the $N^{th}$ data sectors of the MDR system 501. In some embodiments, the number of outer codewords combined from each track may not be the same.

MDR systems that have three or more tracks may include interleaving outer code implementations involving some or all of the tracks in the system. For example, in a five track MDR system, outer codewords for tracks one and two may be interleaved, and the outer codewords for tracks three and four may be interleaved, and track five may not be interleaved. In another example, all tracks in a MDR system may be interleaved together. Tracks in an interleaved MDR system can have different code rates.

Interleaving outer codewords can produce outer codes that can handle a higher level of diversity in the signal to noise ratio (SNR) of the sectors in the corresponding tracks. (e.g. symbols from a variety of locations than in the case where the sectors protected by the outer code are not-interleaved. MDR systems that include interleaving outer codewords may use fewer parity sectors and have more data sectors than comparable MDR systems without interleaving outer codes. For example, system 500 may have comparable error protection as system 300, but may have fewer parity sectors. The SNR diversity of a MDR system may increase as the number of interleaving outer codewords increase. MDR systems can be designed to achieve a predetermined level of error protection while accounting for other factors that may be affected, such as noise, seek times, and so forth. Outer codes with high SNR diversity may be more reliable or robust than outer codes with lower SNR diversity.

A GBCC can encode an interleaving system of outer codewords in different memory types, which may be in different physical locations. For example, a memory group may be a track on a magnetic disc, and another memory group may be a flash memory, and yet another memory group may be an optical storage memory.

Figure 6:
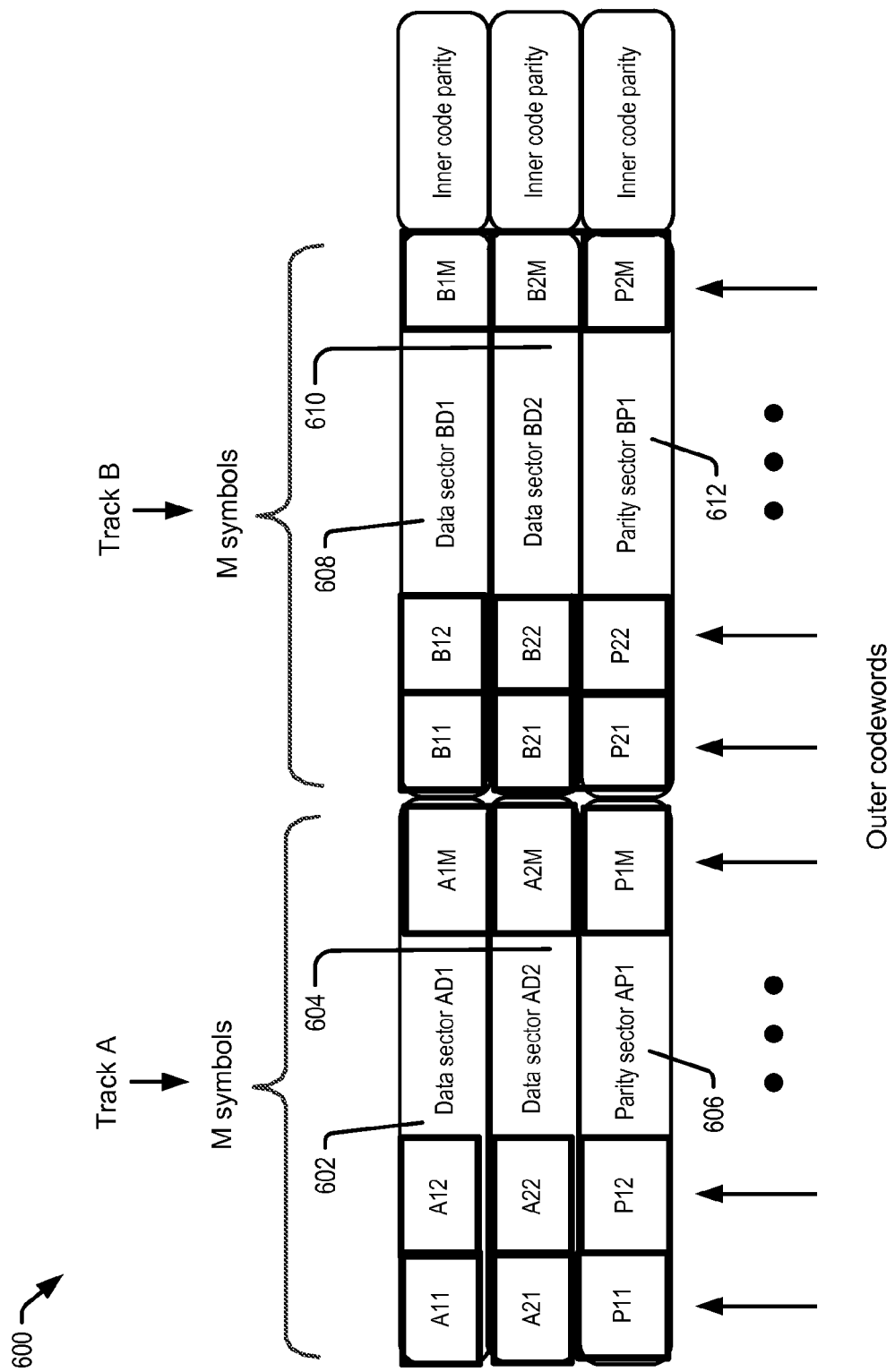
FIG. 6 is a system of group based codes for MDR, in accordance with certain embodiments of the present disclosure.

Referring to FIG. 6, a system of group based codes for MDR is shown and generally designated 600. The system 600 may be an example embodiment of system 500. The MDR system 600 can include two tracks (e.g. track A and track B). Each track can have two data sectors and a parity sector, although in some embodiments, tracks can have more than two data sectors or a plurality of parity sectors. In some examples, a track may have 100 or more sectors. Track A can include data sector AD1 602, data sector AD2 604, and parity sector AP1 606. Track B can include data sector BD1 608, data sector BD2 610, and parity sector BP1 612. The parity sector AP1 606 and data sectors AD1 602 and AD2 604 in track A may include the same number of symbols as the parity sector BP1 612 and data sectors BD1 608 and BD2 610 (e.g. M symbols). In some embodiments, the number of data and parity symbols may be different for some or all of the tracks in an MDR system.

A GBCC, such as GBCC 204, may interleave two or more tracks in a MDR system. For example, the GBCC may interleave outer codewords by combining symbols from alternating data sectors to produce outer codes, and store the outer codes to parity sectors on different tracks. In the embodiment of system 600, a GBCC can combine the symbols from data sector AD1 602 and data sector BD2 610, and the GBCC (or a controller, channel, processor, firmware, software, etc.) can encode or store the combined data to parity sector AP1 606. Codewords in data sectors AD2 604 and BD1 608 may be combined, encoded, and stored to parity sector BP1 612.

The GBCC may interleave the outer codewords in a plurality of ways, such as by every two or more alternating sectors, or in a quasi-periodic or non-periodic pattern. Symbols from two or more tracks in an MDR system may be interleaved together regardless of their physical location in the system (e.g. they may be adjacent or non-adjacent). The GBCC can interleave some tracks while not interleaving others, and may interleave tracks that have different outer code strengths (e.g. different code rates)

Figure 7:
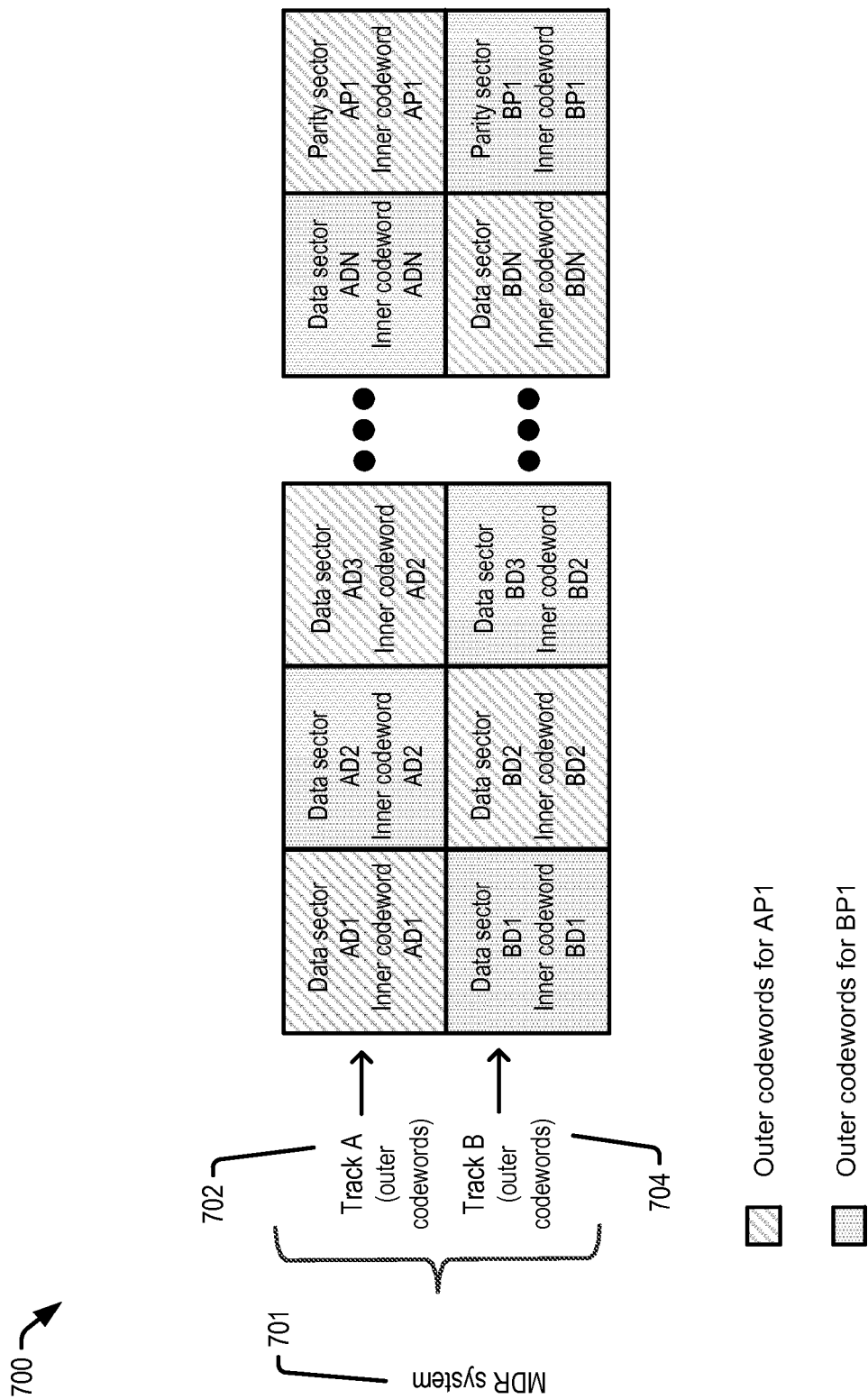
FIG. 7 is a diagram of group based codes for MDR, in accordance with certain embodiments of the present disclosure.

Referring to FIG. 7, a system of group based codes for MDR is shown and generally designated 700. System 700 may be an example embodiment of systems 200, 300, 400, and 500. System 700 can include two tracks: track A 702 and track B 704, and each track may have N data sectors and one parity sector. In some examples, system 700 can have three or more tracks, and the tracks can span different numbers of data sectors or parity sectors.

System 700 may be similar to MDR system 501 in that the outer codewords are interleaved. The inner codes of system 700, however, may correspond to a sector in a track, rather than to multiple sectors in a track. For example, data sector AD1 may have a unique inner codeword.

Figure 8:
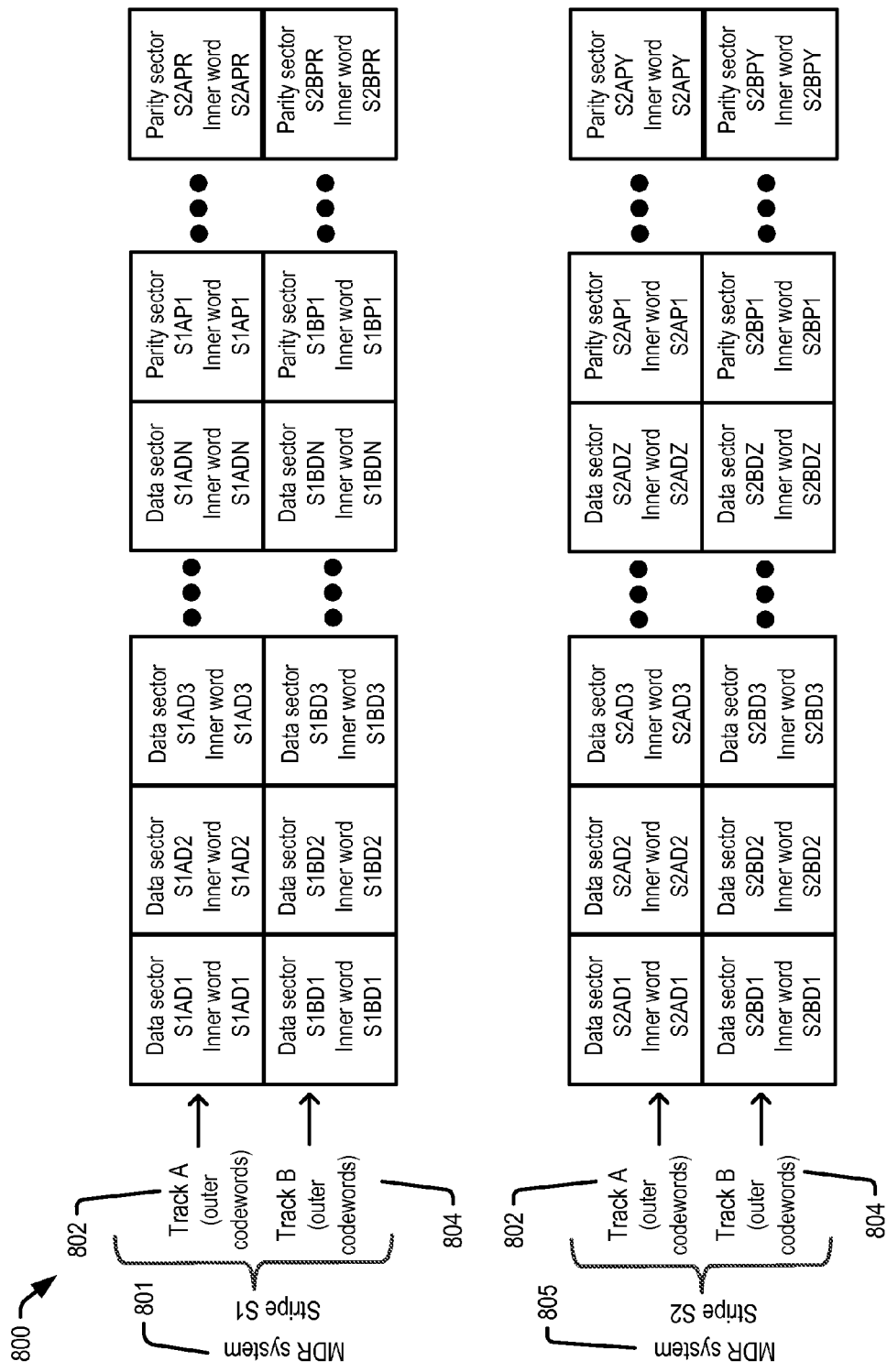
FIG. 8 is a system of group based codes for MDR, in accordance with certain embodiments of the present disclosure.

Referring to FIG. 8, a system of group based codes for MDR is shown and generally designated 800. The system 800 may be an example embodiment of systems 200, 300, 400, 500, and 700. In some embodiments, MDR systems may span the length of the included tracks; all of the sectors in a track that can store user data may be included in the MDR system. In other embodiments, an MDR system may span a portion of the length of the tracks (e.g. a stripe); a percentage of the sectors in a track configured to store user data may be included in an MDR system.

The system 800 can include two MDR systems (e.g. MDR system S1 801, and MDR system S2 805), and each MDR system can include track A 802 and track B 804. MDR systems S1 801 and S2 805 may different sizes; the combined number of data and parity sectors can vary from system to system, although in some examples, MDR stripes may be the same size. MDR systems S1 801 and S2 805 can include the same number of tracks (e.g. each system contains two tracks), although in some cases, MDR stripes may contain a different number of tracks. For example, a MDR system can include two tracks while another MDR system can have four tracks.

Inner and outer code implementation may vary by stripe. A GBCC, such as GBCC 204, can interleave some or all of symbols in a stripe. A circuit, such as a GBCC, a channel, a controller, a processor, firmware, software, and so forth, may encode ECC one sector at a time (see FIG. 8), via multiple sector groupings (see FIG. 3), or via other methods not listed.

The size of a stripe may affect error recovery or on-the-fly (OTF) performance. Outer codes can recover errors in one or more data sectors; higher error recovery performance can increase the likelihood that larger errors, such as squeeze errors, can be repaired. For example, an outer code with a twelve bit ECC can protect more data than an outer code with a six bit ECC. OTF performance can be how quickly and efficiently an MDR system can restore corrupted data while maintaining the system throughput without halting the system or starting a retry or error recovery procedure. Outer codes may be read from, or stored to, all of the user data sectors in an MDR system during a full rotation of the disc; OTF performance can be reduced when a host is reading less than all of the data or parity sectors in the track(s) containing data errors. When an MDR system has fewer parity and data sectors than are on the full length of the tracks, it may access the outer codes in less than a full revolution disc, thus decreasing access times. Reducing the size of a stripe can increase OTF performance but may reduce error correction performance because there may be shorter length or weaker outer codewords from which to restore sector errors.

The above embodiment may be implemented in non-magnetic systems, such as solid state memory systems, optical memory systems, and so forth. For example, a stripe may be in an optical memory system, while another stripe may be in a solid state memory system.

Figure 9:
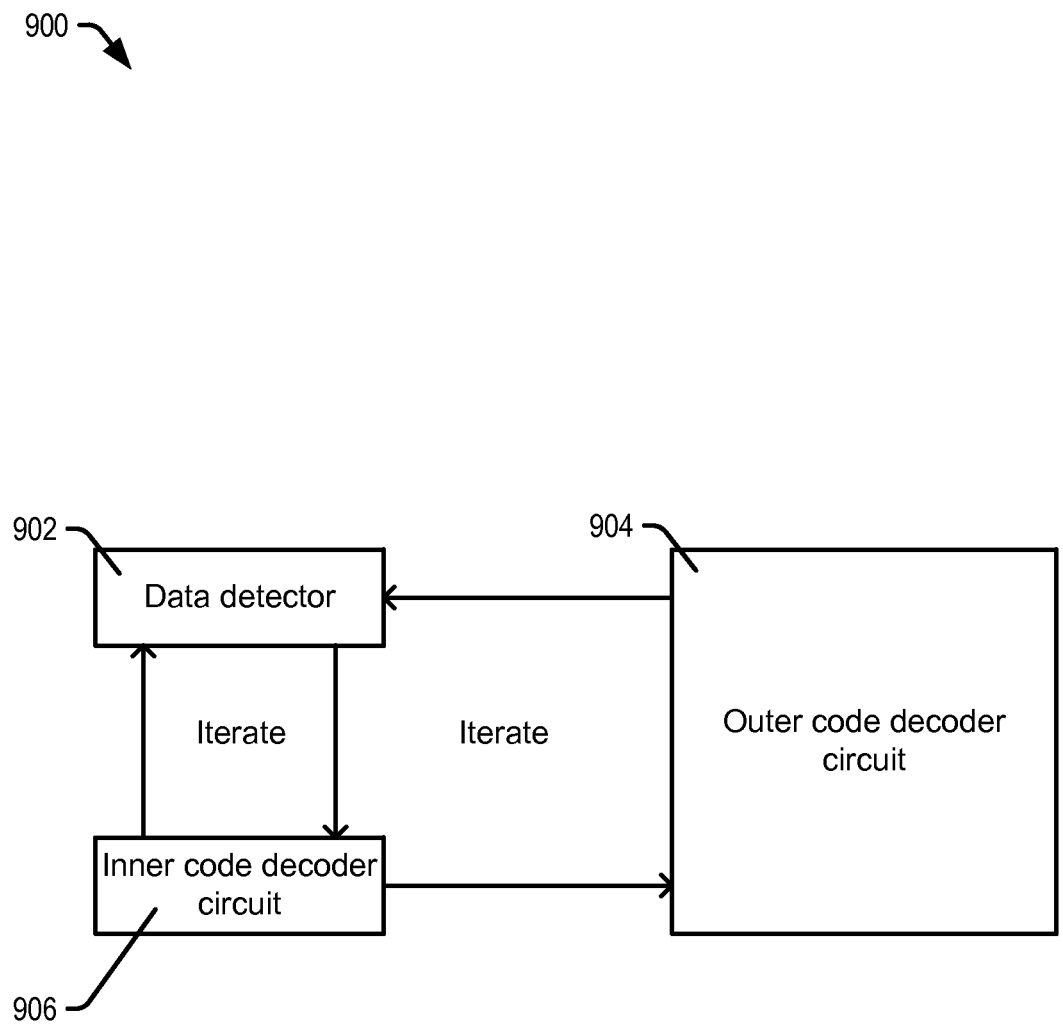
FIG. 9 is a system of group based codes for MDR, in accordance with certain embodiments of the present disclosure.

Referring to FIG. 9, a system of group based codes for MDR is shown and generally designated 900. A GBCC, controller, processor, channel, or other circuit, firmware, software, or any combination thereof, may correct data errors using inner codes, outer codes, or both. In some cases, a data storage system may restore, or attempt to correct data errors using inner codes; the affected data in one or more sectors may be repaired by decoding the inner codewords in the sector(s) corresponding to the corrupted data.

Inner codes can have an error correction capacity that may not be robust enough to repair all data errors. For example, the error may be too big for the inner codes to converge (e.g. to arrive at a solution). Outer codes may repair data errors that cannot be fixed by inner codes. In some embodiments, a data storage system may perform a one-shot decoding. Inner codewords that fail to converge may be erased and reconstructed using the outer code decoder.

System 900 may contain a data detector 902, an inner code decoder 906, and an outer code decoder 904. The data detector 902, which may be one or more transducers in an a recording head of an MDR system, may be coupled to a channel circuit, a GBCC, or other circuit. The inner code decoder 906 and outer code decoder 904 may be stand-alone circuits, may be independently or collectively included in a GBCC circuit, a channel, or other circuit, or may be implemented in firmware or software.

A data storage system may repair data errors iteratively. In some cases, inner codewords may repair some data errors even though they fail to converge. The outer code decoder circuit 904 may repair some of the data errors based on information provided by the inner code decoder circuit 906 and information stored in the parity sectors. The data detector 904 can detect the repaired data and provide the information to the inner code decoder circuit 906. The inner code decoder circuit 906 may attempt to repair the data errors with the provided information. The iterative cycle may continue until the data errors are repaired, which may be when inner codes converge. In some systems, the GBCC may vary the strengths of the outer codewords. Data storage systems that encode data with more than one set of outer codes (e.g. interleaved systems) may iterate across the different outer codes and the inner codewords.

In some MDR systems, iterations can exchange information between the outer codes of two or more tracks and inner codes that include sectors from two or more tracks. When the outer codes are interleaved, the data storage system can iterate between the inner codewords and the interleaved outer codes, which may improve error correction performance.

The decoding methods above may be applied to different memory types, including a magnetic disc memory, or solid state memory. Data from one memory group, such as a track or a flash memory block, may be used to restore data anywhere in the MDR system. For example, interleaved outer codewords from two tracks in a disc memory and one block in a flash memory may be iterated with the inner codeword corresponding to the sector where the data error occurred.

Figure 10:
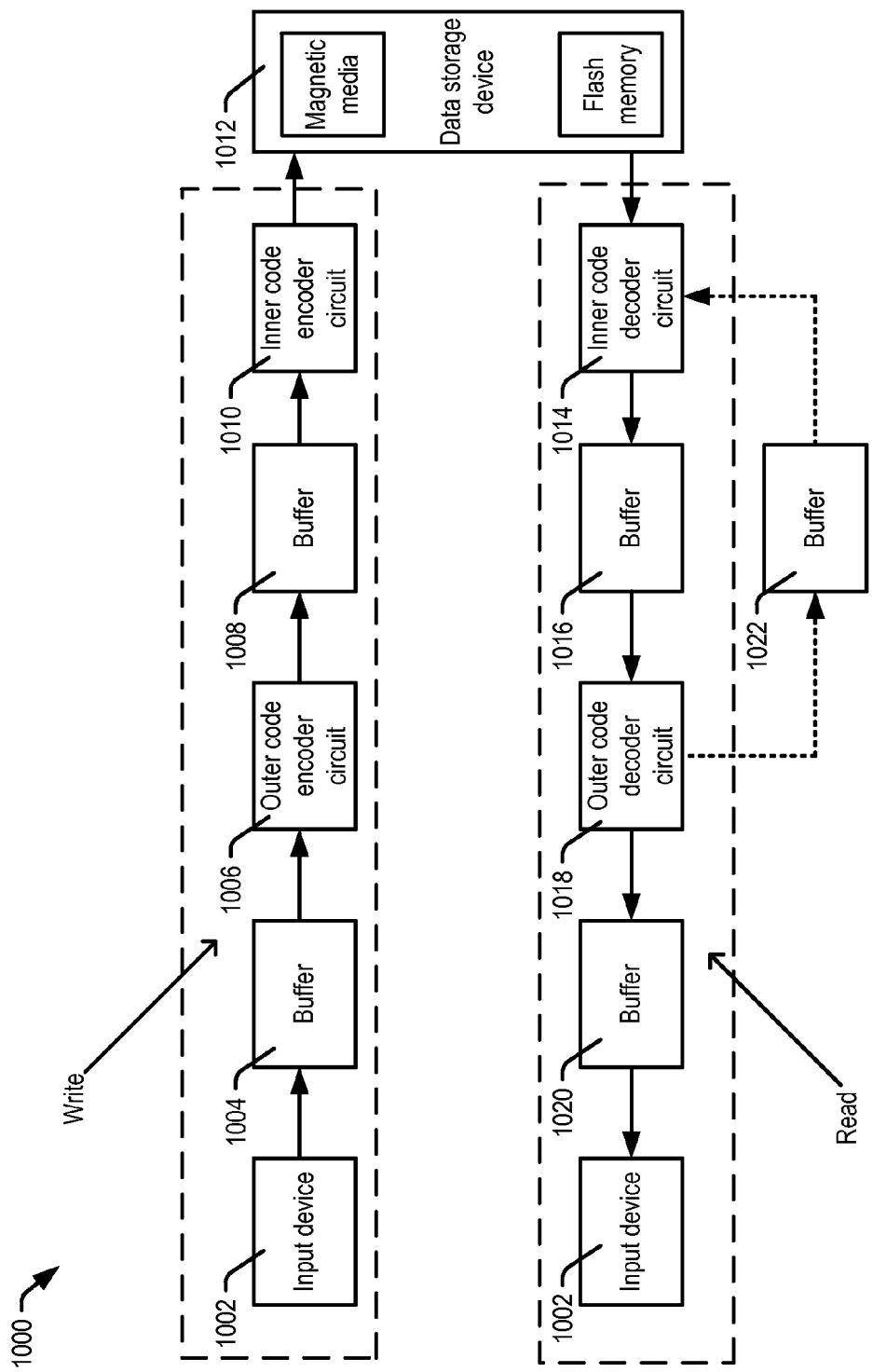
FIG. 10 is a system of group based codes for MDR, in accordance with certain embodiments of the present disclosure.

Referring to FIG. 10, a system of group based codes for MDR is shown and generally designated 1000. System 1000 may be an example embodiment of systems 200, 300, 400, and 500. System 1000 can have an input device 1002, outer code encoder circuit 1006, inner code encoder circuit 1010, data storage device (DSD) 1012, inner code decoder circuit 1014, and outer code decoder circuit 1018. System 1000 may also include buffers 1004, 1008, 1020, 1016, and 1022. The buffers may be located in the same memory device, or may be located in several memory devices.

Data from the input device 1002 can be stored in buffer 1004, which may be volatile memory, non-volatile solid state memory, magnetic memory, other memory, or any combination thereof. The buffer 1004 may accumulate data from multiple inputs simultaneously, or from the same input at different times. A processor, such as a controller, can send the input data to the outer code encoder circuit 1006; the processor may send the input data to the outer code encoder circuit 1006 based on triggers, such as the expiration of a timer, exceeding a threshold storage level in the buffer, and so forth.

The outer code encoder circuit 1006 can determine the outer codes (e.g. outer code parity) corresponding to the input data. In MDR systems, the outer code encoder circuit 1006 can determine the outer codes for two or more inputs. For example, the outer code encoder circuit 1006, which may be the GBCC 204, can determine the outer codes for two or more tracks of disc storage, pages of flash storage, other storage, or any combination thereof. The outer code encoder circuit 1006 may also determine what method to use to encode the data (e.g. interleaved, non-interleaved, etc.). The input data and the corresponding parity data can be transferred to the inner code encoder circuit 1010 via a buffer 1008; in some embodiments, data may be transferred directly from the outer code encoder circuit 1006 to the inner code encoder circuit 1010. The inner code encoder circuit 1010, which may be a channel circuit, can determine the inner code parity corresponding to the data sectors, which can include outer code parity data. The data storage device 1012 can store the input data, outer code parity data, and inner code parity data, to one or more storage media, such as magnetic media or flash memory.

Data in the data storage device 1012 may be requested by the input device (e.g. host) 1002. Error free data can be provided to the host 1002. When there is an error(s) in the requested data, the data may be sent to an inner code decoder circuit 1014. The inner code decoder circuit 1014 may be the same as the inner code encoder circuit 1010, although it may be separate. The inner code decoder circuit 1014 can attempt to recover the data error(s). When the data error(s) are beyond the ability of the inner code decoder circuit 1014 to repair, the data may be sent to the outer code decoder circuit 1018 via a buffer 1016; the outer code decoder circuit 1018 may be the GBCC 204. In some embodiments, data may be transferred from the inner code decoder circuit 1014 to the outer code decoder circuit 1018 without first being stored in the buffer 1016. The outer code decoder circuit 1018 can attempt to recover the data error(s). When the data recovery is successful, the data can be sent to the host 1002 via a buffer 1020. When the data recovery is not successful, the outer code decoder circuit 1018 and the inner code decoder circuit 1014 may iteratively repair data errors. Data may be sent from the outer code decoder circuit 1018 to the inner code decoder circuit 1014 during recovery iterations via a buffer 1022.

All embodiments described herein may be implemented in disc storage systems, non-volatile memory systems, or other storage systems.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
  a circuit configured to:
  receive data from at least two inputs which are configured to access two or more memory groups at one time;
  determine inner codes and outer codes corresponding to the data; and
  perform error correction operations on the data based on the inner codes and the outer codes.

2. The apparatus of claim 1 further comprising:
  the circuit configured to:
  receive first data at a first input of the at least two inputs, the first data including first segments of data, each first segment having multiple symbols;
  receive second data at a second input of the at least two inputs, the second data including other segments of data, each other segment having multiple symbols;
  the inner codes include inner codewords, each inner codeword contains parity data corresponding to a pre-determined first segment and a pre-determined other segment, the parity data includes data for correcting X number of errors in the pre-determined first segment or the pre-determined other segment; and
  the outer codes contain M number of symbols from pre-determined segments of the first data and the second data, the outer codes include data for correcting N number of errors of symbols.

3. The apparatus of claim 2 comprising the circuit further configured to:
  encode the first data and the second data to produce the outer codes.

4. The apparatus of claim 2 comprising the circuit further configured to:
  receive the first data and the second data from a multi-dimensional reading (MDR) system having at least a first read element corresponding to the first input and a second read element corresponding to the second input; and
  the inner codewords include parity data calculated based on multiple segments.

5. The apparatus of claim 2 comprising the circuit further configured to:
  receive the first data and the second data from a multi-dimensional reading (MDR) system having at least a first read element corresponding to the first input and a second read element corresponding to the second input; and
  the outer codes include symbols from the pre-determined segments of the first data interleaved with symbols from pre-determined segments of the second data.

6. The apparatus of claim 5 further comprising:
  the inner codewords include parity data calculated based on multiple pre-determined segments.

7. The apparatus of claim 5 further comprising:
the inner codewords include parity data calculated based on a single pre-determined segment.

8. The apparatus of claim 2 further comprising the pre-determined segments are less than all segments of the first data and the second data.

9. The apparatus of claim 8 comprising the circuit further configured to:
symbols from the pre-determined segments of the first data interleaved with symbols from pre-determined segments of the second data to produce the outer codes.

10. The apparatus of claim 2 comprising the circuit further configured to:
perform the error correction operation based on the inner codes; and
when the error correction operation does not converge, perform the error correction operation based on the outer codes.

11. The apparatus of claim 2 comprising the circuit further configured to:
iteratively decode between the inner codes and the outer codes; and
vary a calculation of the outer codes during the iterative decoding.

12. An apparatus comprising:
a data storage medium including:
a first data set stored in a first distinct area, and a second data set stored in a second distinct area;
inner codes and outer codes corresponding to a pre-determined combination of the first data set and the second data set;
a multi-dimensional recording system configured to access two or more memory groups of the data storage medium at approximately a same time; and
a coding circuit configured to receive data corresponding to the inner codes and outer codes of two memory groups to perform error correction operations on the first data set and the second data set.

13. The apparatus of claim 12 further comprising:
the data storage medium is a disc in a magnetic storage device;
the first distinct area is a first track on the disc and the second distinct area is a second track on the disc;
each track is logically divided into a pre-determined number of sectors, each of the sectors having a pre-determined number of symbols; and
at least one of the pre-determined sectors is a parity sector configured to store error correcting code (ECC).

14. The apparatus of claim 12 further comprising:
the coding circuit is further configured to perform error correction operations utilizing the inner codes from a pre-determined sector of the first distinct area and a pre-determined sector of the second distinct area; and the inner codes include data to perform error correction operations from a pre-determined parity sector of the first distinct area and a pre-determined parity sector of the second distinct area.

15. The apparatus of claim 12 further comprising:
the outer codes are a combination of the symbols from the first distinct area and the symbols from the second distinct area.

16. The apparatus of claim 15 further comprising:
the outer codes are the symbols from a first track interleaved with the symbols from a second track of a disc data storage medium.

17. The apparatus of claim 14 further comprising:
the coding circuit is further configured to perform error correction operations utilizing the inner codes from a pre-determined sector of the first distinct area and second data to perform error correction operations from a pre-determined sector of the second distinct area; and
the outer codes are the symbols from the first distinct area interleaved with the symbols from the second distinct area.

18. The apparatus of claim 12 further comprising:
the outer codes contains a number of symbols from pre-determined sectors of the first distinct area track and the second distinct area; and
the pre-determined sectors are less than all of the first distinct area and the second distinct area.

19. A method comprising:
receiving first data from a first input, the first data including first segments of data, each segment of the first segments having multiple symbols;
receiving second data at a second input at approximately the same time as the first data is received at the first input, the second data including second segments of data, each segment of the second segments having multiple symbols;
determining inner codes and outer codes corresponding to the data; and
performing error correction operations on the data based on the inner codes and the outer codes.

20. The method of claim 19 further comprising:
when the data has at least one error, attempting to fix the at least one error by performing the error correction operations using inner codes corresponding to a segment having at least one error;
when the at least one error is not repaired by the performing error correction operations using the inner codes, performing error correction operations using the outer codes; and
when the at least one error is not repaired by the performing error correction operations using the outer codes, repairing the at least one error by iteratively performing error correction operations via the inner codes and the outer codes.

* * * * *